United States Patent
Lichmanov

(10) Patent No.: US 9,400,540 B2
(45) Date of Patent: Jul. 26, 2016

(54) EVENT BASED DYNAMIC POWER MANAGEMENT

(71) Applicant: ATI Technologies ULC, Markham (CA)

(72) Inventor: Yury Lichmanov, Richmond Hill (CA)

(73) Assignee: ATI Technologies ULC, Markham, Ontario (CA)

(*) Notice: Subject to any disclaimer, the term of this patent is extended or adjusted under 35 U.S.C. 154(b) by 393 days.

(21) Appl. No.: 13/898,025

(22) Filed: May 20, 2013

(65) Prior Publication Data
US 2014/0344587 A1    Nov. 20, 2014

(51) Int. Cl.
*G06F 1/32* (2006.01)

(52) U.S. Cl.
CPC .............. *G06F 1/3206* (2013.01); *G06F 1/324* (2013.01); *G06F 1/3209* (2013.01); *G06F 1/3215* (2013.01)

(58) Field of Classification Search
CPC ....... G06F 1/26; G06F 1/3206; G06F 1/3209; G06F 1/3218; G06F 1/324; G06F 1/3265; G06F 1/3287; G06F 3/14; G06F 3/1415; G06F 3/1454; G06F 3/1462; G06F 1/3203; G09G 2230/021; G09G 2360/08; G09G 2370/22
See application file for complete search history.

(56) References Cited

U.S. PATENT DOCUMENTS

| | | | |
|---|---|---|---|
| 6,304,978 B1 * | 10/2001 | Horigan et al. | 713/322 |
| 7,337,339 B1 * | 2/2008 | Choquette et al. | 713/320 |
| 2008/0205316 A1 * | 8/2008 | Minematsu et al. | 370/310 |
| 2009/0089543 A1 * | 4/2009 | Gunther | G06F 9/30181 712/30 |
| 2010/0293402 A1 * | 11/2010 | Marinkovic et al. | 713/320 |
| 2013/0054566 A1 * | 2/2013 | Xu | G06F 17/3053 707/713 |
| 2013/0054997 A1 * | 2/2013 | Wyatt et al. | 713/323 |

OTHER PUBLICATIONS

Advanced Configuration and Power Interface Specification, Hewlett-Packard Corporation; Intel Corporation; Microsoft Corporation; Phoenix Technologies Ltd.; Toshiba Corporation; Revision 4.0a, Apr. 5, 2010.

* cited by examiner

*Primary Examiner* — Dennia M Butler
(74) *Attorney, Agent, or Firm* — Volpe and Koenig, P.C.

(57) ABSTRACT

An apparatus, computer readable medium, and method of event based dynamic power management. The method includes responding to receiving an indication of an event that is external to a hardware block engine by adjusting the power to the hardware block engine, if the event indicates that the power to the hardware block engine should be adjusted. The method may include receiving a second event that is external to the hardware block engine. The method may include determining whether or not the power should be adjusted to the hardware block engine based on the event and the second event. If it is determined that the power should be adjusted, then the power may be adjusted to the hardware block based on the event and second event. A method of monitoring a component and sending an indication of an event that the component will not require a hardware block engine is disclosed.

18 Claims, 4 Drawing Sheets

EVENT BASED DYNAMIC POWER MANAGEMENT

FIELD OF THE INVENTION

The present invention is generally directed to power management, and in particular to event based dynamic power management.

BACKGROUND

The amount of power required to operate a computer system is often an important feature of the computer system. Customers desire computer systems that can run a long time from a single battery charge and customers desire computers that produce as little heat as possible. The heat is produced from the consumption of power. Additionally, a computer system may have additional components if power to use the current components is reduced.

Often, solutions to reducing power consumed by computer systems involve monitoring a component of the computer system and when the component has been idle for a threshold period of time then reducing the power to the component. However, often the power consumed by the component during the idle period is significant.

SUMMARY OF EMBODIMENTS

Therefore, there is a need in the art for an apparatus, computer readable medium, and method of event based dynamic power management. The method includes responding to receiving an indication of an event, which is external to a hardware block engine, by adjusting the power to the hardware block engine, if the received event indicates that the power to the hardware block engine should be adjusted.

The event may be an indication that a frame buffer for a wireless display has not changed or an indication that the frame buffer for the wireless display has changed.

The method may include receiving a second event that is external to the hardware block engine. The method may include determining whether or not the power should be adjusted to the hardware block engine based on the event and the second event. If it is determined that the power should be adjusted, then the power may be adjusted to the hardware block based on the event and second event.

The power to the hardware block engine may be adjusted for an amount of time based on the received event.

The power to the hardware block engine may be adjusted for an amount of time based on the received event and an internal state of the hardware block engine.

The hardware block engine may receive the event and the second event. A power management module may receive the event and the second event.

The power to the hardware block engine may be adjusted by reducing a number of clock cycles, or increasing the number of clock cycles. The number of clock cycles may be a number of clock cycles used to drive the hardware block engine.

The event may not be based on monitoring the activity of the hardware block engine.

The hardware block engine may be an encoding hardware block engine used to encode a frame buffer for sending to a wireless display, or a video accelerator.

A device for dynamic power management is disclosed. The device may include an external event detector configured to detect an event related to a component and configured to send an indication of the event to a power manager. The device may include a hardware block engine configured to perform a service for the operation of the component. The power manager may be configured to receive the indication of the event and if the received event indicates that the power to the hardware block engine should be adjusted, then the power manager may adjust the power to the hardware block engine.

The event may be an indication that a frame buffer for a wireless display has not changed, or an indication that the frame buffer for the wireless display has changed The device may include a second external event detector configured to detect a second event related to a second component. The second external event detector may be configured to send an indication of the second event to the power manger. The power manager may be configured to receive a second event that is external to the hardware block engine. The power manager may be configured to adjust the power by determining whether or not the power should be adjusted to the hardware block engine based on the event and the second event. The power manager may be configured to adjust the power to the hardware block based on the event and second event, if it is determined that the power should be adjusted then adjusting the power to the hardware block based on the event and second event.

The hardware block engine may include an internal state. The power manager may be configured to adjust the power to the hardware block engine for an amount of time based on the received event and an internal state.

Adjusting the power to the hardware block engine may include one or more of reducing a number of clock cycles, or increasing the number of clock cycles. The number of clock cycles may be a number of clock cycles used to drive the hardware block engine.

The hardware block engine may be an encoding hardware block engine used to encode a frame buffer for sending to a wireless display or a video accelerator.

The power manager may be part of the hardware block manager.

A method of event based dynamic power management is disclosed. The method may include monitoring a component and sending an indication of an event that the component will not require a hardware block engine.

Monitoring the component may include sending the indication of the event, if the component will not require the hardware block engine, and sending an indication of the event that indicates that the component will require the hardware block engine, if the component will require the hardware block engine.

Sending an indication of an event may include sending an indication of the event to a power manager or the hardware block engine.

A method of event based dynamic power management is disclosed. The method may include responding to receiving an indication of an event that is external to a plurality of hardware block engines by adjusting the power to one or more of the plurality of hardware, if the power can be adjusted to the one or more of the plurality of hardware block engines based on the received indication of an event.

A computer readable non-transitory medium including instructions which when executed in a processing system cause the processing system to execute a method for event based dynamic power management is disclosed. The method includes responding to receiving an indication of an event, which is external to a hardware block engine, by adjusting the power to the hardware block engine, if the received event indicates that the power to the hardware block engine should be adjusted.

BRIEF DESCRIPTION OF THE DRAWINGS

A more detailed understanding may be had from the following description, given by way of example in conjunction with the accompanying drawings wherein.

DETAILED DESCRIPTION OF EMBODIMENTS

Figure 1:
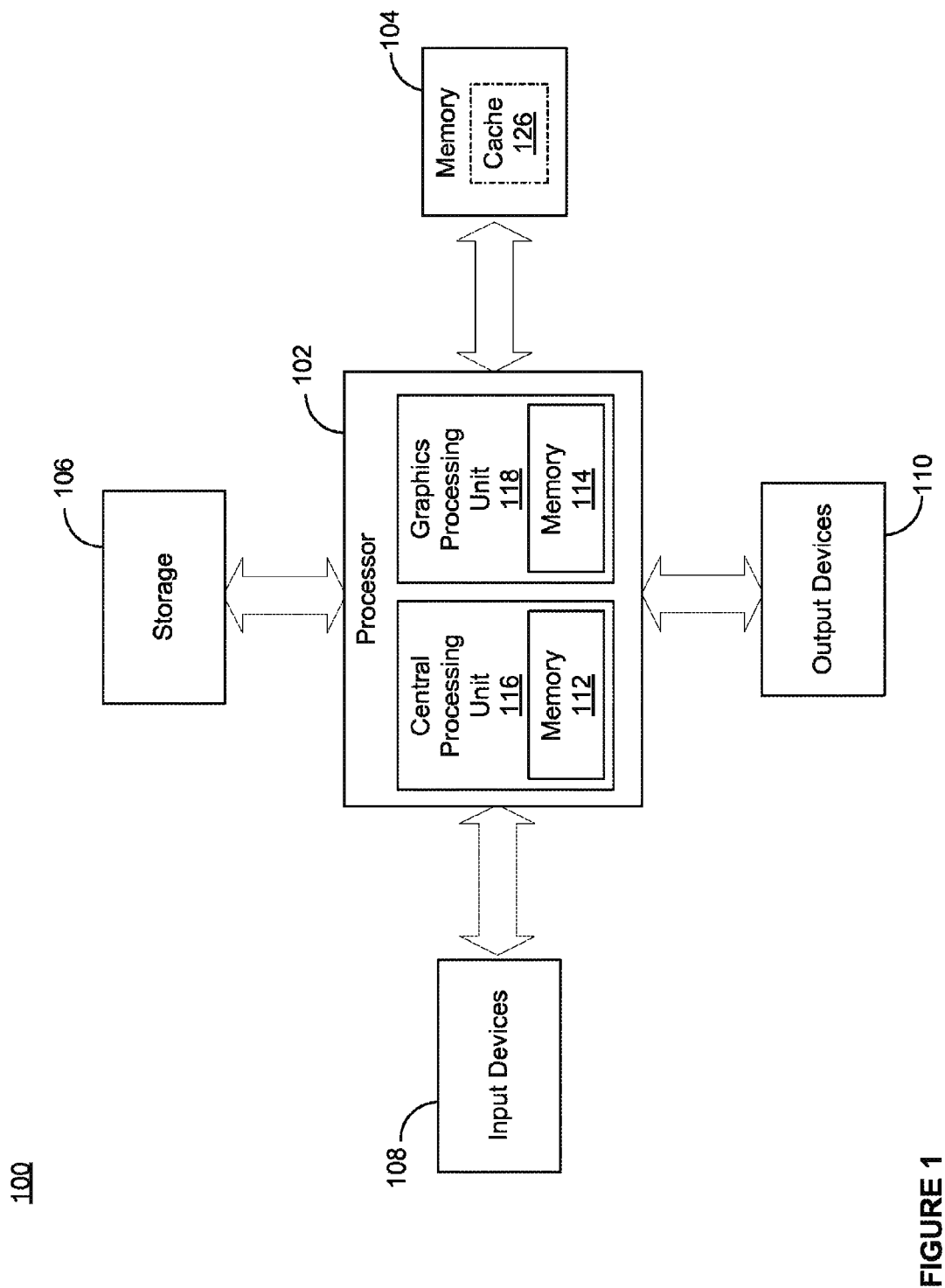
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. It is understood that the device 100 may include additional components not shown in FIG. 1.

The processor 102 may include a central processing unit (CPU) 116, a graphics processing unit (GPU) 118, which may be located on the same die or different dies. The CPU 116 may include a memory 112 and one or more processor cores (not illustrated). Each of the processor cores may itself be a CPU 116 or a GPU 118. The memory 112 may be a memory that is only accessible to the CPU 116 or it may be a shared memory accessible by other components of the system 100 such as the GPU 118. The GPU 118 may include a memory 114 which may be accessible only to the GPU 118 or it may be a shared memory accessible by other components of the system 100 such as the CPU 116. In some embodiments, the GPU 118 is located in a different die 102 than the CPU 116. For example, the GPU 118 may be located in an input/output device that communicates with the CPU 116 via a communications bus.

The memory 104 may be located on the same die as the processor 102, or may be located separately from the processor 102. The memory 104 may include a volatile or non-volatile memory, for example, random access memory (RAM), dynamic RAM, or a cache. The memory 104 may include a cache (not illustrated) which may be a type of storage that may have faster access times than other portions of the memory 104.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

Figure 2:
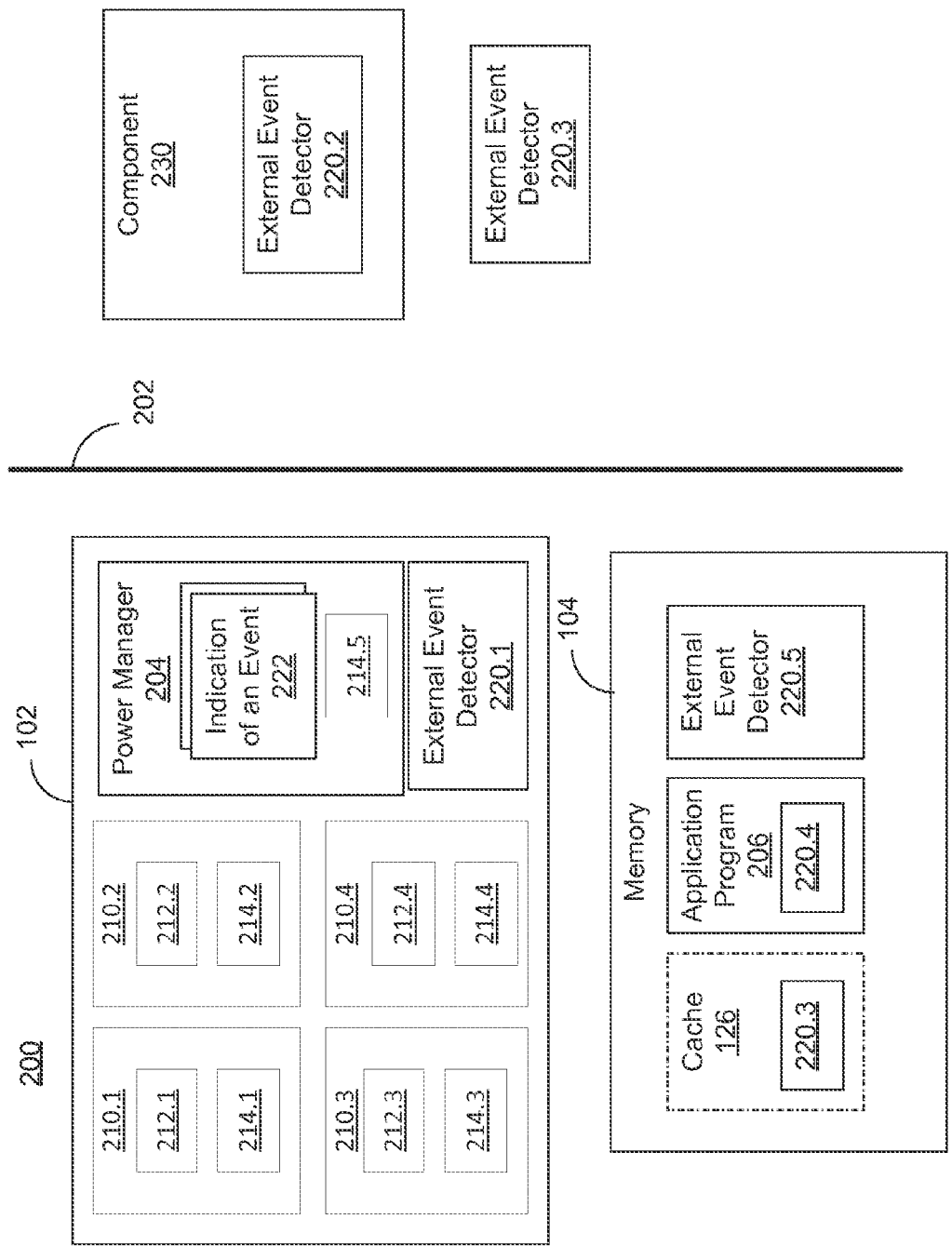
FIG. 2 illustrates a device for event based dynamic power management according to some embodiments.

FIG. 2 illustrates a device for event based dynamic power management according to some embodiments. Illustrated in FIG. 2 are a communications bus 202, a processor 102, a component 230, memory 104, and an external event detector 220.

The external event detector 220 sends an indication of an event to the power manager 204, which then adjusts the power to one or more of the hardware block engines 210 in response to receiving the event. In some embodiments, alternatively, or in addition, the external event detector 220 sends the indication of an event to one or more of the hardware block engines 210.

The communications bus 202 may be a communications bus 202 which enables the processor 102, component 230, memory 104, and external event detector 220 to communicate with one another.

The processor 102 may include a power manager 204, hardware block engines 210, and external event detector 220. The power manager 204 may be configured to receive an indication of an event 222 from external event detectors 220. The power manager 204 may be configured to control the power to the hardware block engines 210. For example, the power manager 204 may be configured to control the clock speed to one or more of the hardware block engines 210. The power manager 204 may be configured to control the power to the hardware block engines 210 based on one or more indications of an event 222. For example, the power manager 204 may be configured to reduce the power to a hardware block engine 210, which may be an encoder, if the power manager 204 receives an indication of an event 222 that indicates that a frame buffer of a wireless display 330 (see FIG. 3) has not changed, and an indication that a user pointing device (not illustrated) was not used. The power manager 204 may be configured to control the power to the hardware block engines 210 for a period of time based on one or more indications of an event 222. In some embodiments, the power manager 204 may be part of one or more hardware block engines 210.

The hardware block engines 210 may be portions of the processor 102 that perform functions. For example, a hardware block engine 210 may be a portion of the processor 102 that performs encoding. The hardware block engine 210 may include a power control 212 that may be adjusted to adjust the amount of power used by the hardware block engine 210. For example, in some embodiments, the power control 212 may be a way to control the clock speed to the hardware block engine 210. In some embodiments, the hardware block engine 210 may be configured to receive the indication of an event 222 and adjust the power control 212 based on the received indication of an event 222. The hardware block engines 210 may include internal states 214. For example, an internal state 214 may be that the hardware block engine 210 has received idle messages regarding a frame buffer 306 of a wireless display 330. The hardware block engine 210 may then adjust the power to reduce the clock speed for a longer period of time than if there had not been any previous idle messages or if there had been less than a threshold number of idle messages such as 20. The hardware block engine 210 may be configured to adjust the power to reduce the clock speed for a shorter period of time based on the internal state 214.

The component 230 may be a component such as an input device 108, an output device 110, a portion of storage 106, a portion of memory 104, or another component 230 of the system 200. The following are some examples of the component 230 a wireless display 330, a special purpose chip to perform graphics, an optical mouse, a circuit which may be a portion of a die, or a hard-drive. The component 230 may include an external event detector 220.2. For example, a hard-drive 230 may include an external event detector 220.2 that sends an indication of an event 222 to the power manager 204 when the hard-drive 230 is not being accessed, or when the hard-drive 230 is being accessed. As another example, the event detector 220.2 of a hard drive may monitor the hard drive to detect whether or not there was any activity besides system activity.

The external event detector 220 detects events that are external to the one or more hardware block engines 210 and generates an indication of an event 222. The external event detector 220 may send an indication of an event 222 to the power manager 204, or in some embodiments the external event detector 220 may send the indication of an event 222 to the hardware block engine 210. For example, the external event detector 220 may detect whether or not a frame buffer (see FIG. 3) of a wireless video monitor has changed, and if the frame buffer has not changed, then the external event detector 220 may send an indication of an event 222 to the power manager 204, or in some embodiments, to the hardware block engine 210.

The external event detector 220.3 may be located in an input device 108, an output device 110, memory 104, or in the processor 102. External event detector 220 may be a portion of a module in memory 104. For example, a graphics game may be executing in the memory 104 and an external event detector 220 may monitor the graphic game and when an event that may be used to adjust the power to a hardware block engine 210 is detected, then external event detector 220 may send a indication of an event 222 to the power manager 204 or to one or more hardware block engines 210. For example, a player may press a pause button in the graphics game, which may indicate that a portion of the graphics hardware block engine 210 may have the power adjusted to be reduced. The external event detector 220.4 may then send an indication of an event 222 to the power manager 204, which then uses the power control 212 to adjust the power used by the hardware block engine 210. In some embodiments, the external event detector 220 may monitor a resource such as a frame buffer 306 and send or not send an indication of an event 222 periodically based on a period of the resource. For example, an external event detector 220 may monitor a frame buffer 306 for changes to the frame buffer 306 based on a refresh rate of the wireless display 330. The external event detector 220 may then send an indication of an event 222 to a power manager 204 if the monitoring of the frame buffer 306 indicates that the wireless display 330 will not have to be sent the frame buffer 306 for a period of time.

Figure 3:
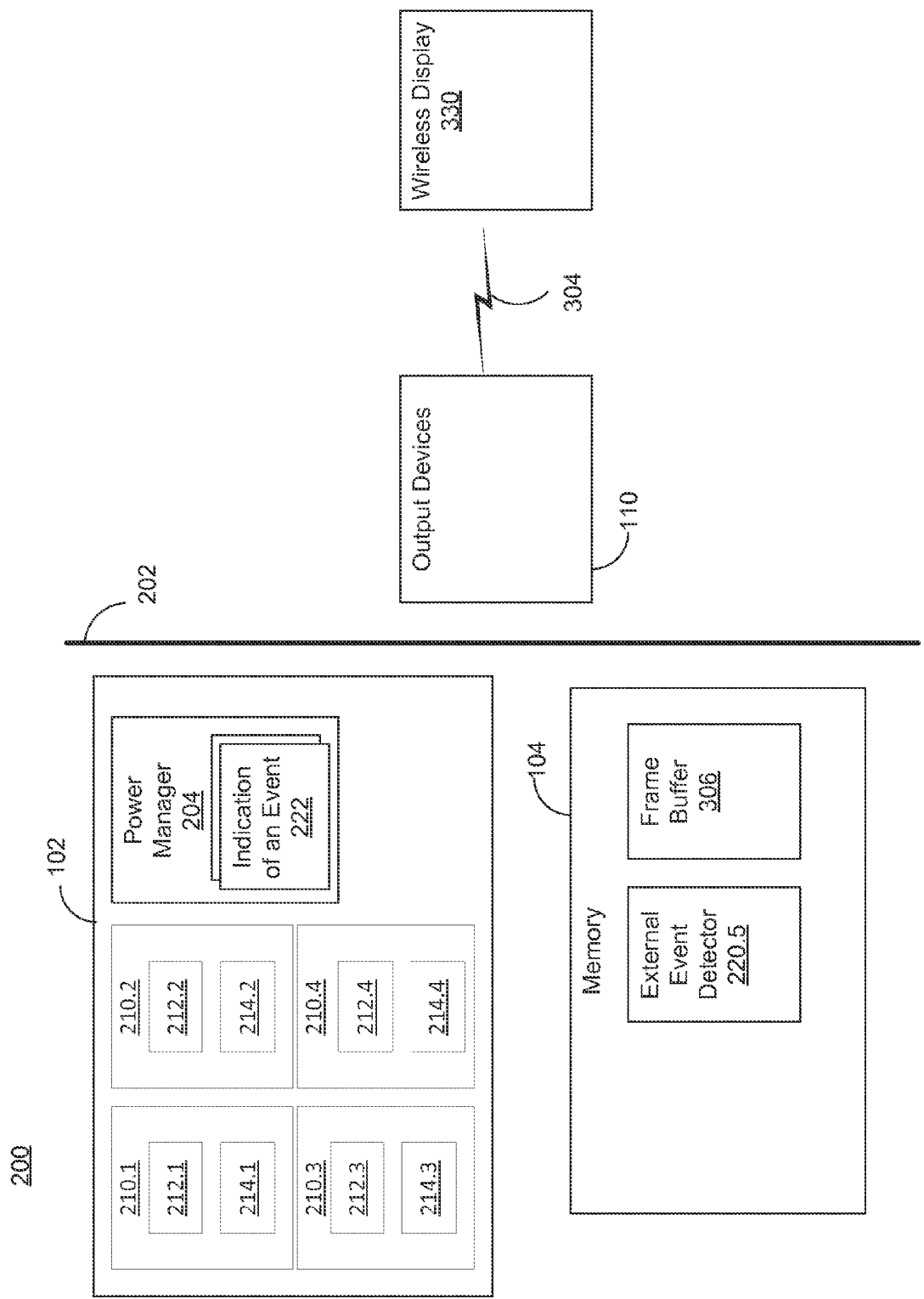
FIG. 3 illustrates an example device according to some embodiments.

FIG. 3 illustrates an example device according to some embodiments. Illustrated in FIG. 3 are a communications bus 202, wireless communications 304, a processor 102, a wireless display 330, memory 104, and an external event detector 220. The wireless communications 304 may be wireless communications such as WirelessHD, 802.11. The system 200 may send the contents of the frame buffer 306 to the wireless display 330. The frame buffer 306 may be a buffer that holds the contents of the wireless display 330.

The external event detector 220.5 may be configured to monitor a frame buffer 306 and to send an indication of an event 222 when the frame buffer 306 has not been modified for a threshold period of time. The power manager 204 may receive the indication of an event 222 that a hardware block engine 210, which may be an encoder that is used to encode the frame buffer 306 for sending over the wireless communications 304, is related to the indication of an event 222. The power manager 204 may then adjust the power to the hardware block engine 210 by using the power control 212, which may be a way to adjust the clock cycle used within the hardware block engine 210.

In some embodiments, the external event detector 220.5 may send the indication of an event 222 to the hardware block engine 222. In some embodiments, the external event detector 220.5 may be a circuit that monitors the portion of the memory 104 used as a frame buffer 306. In some embodiments, the hardware block engine 210 may determine how to adjust the power to the hardware block engine 210 based on receiving a signal from the power manger 204 and based on an internal state 214 of the hardware block engine 222.

Figure 4:
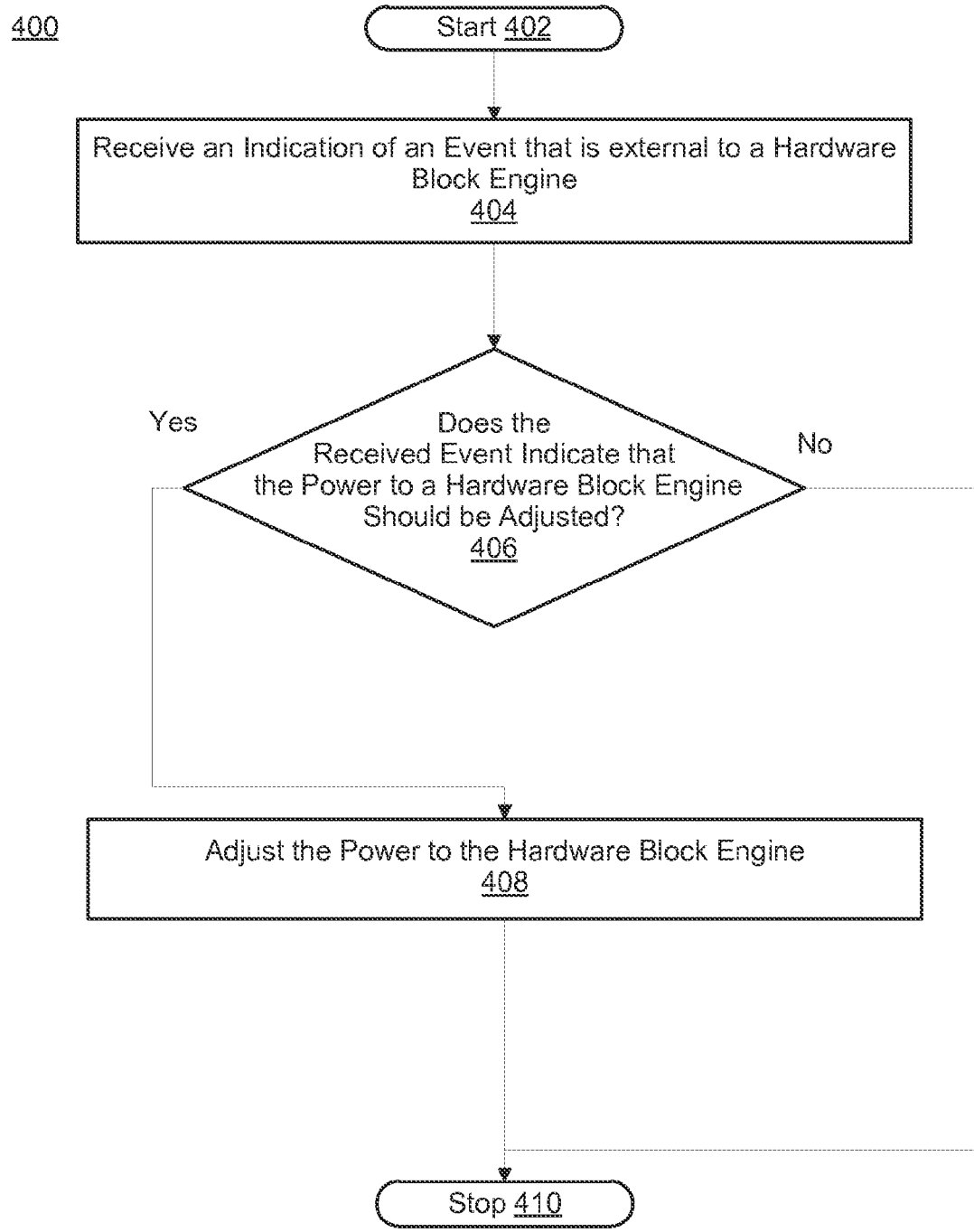
FIG. 4 illustrates a method of event based power management according to some embodiments.

FIG. 4 illustrates a method of event based power management according to some embodiments. The method 400 may begin with start 402. The method may continue with receive an indication of an event that is external to a hardware block engine 404. For example, the power manager 204 of FIG. 3 may receive an indication of an event 222 from the external event detector 220.5 that the frame buffer 306 was not modified. The method 400 may continue with does the received event indicate that the power to a hardware block engine should be adjusted 406. For example, continuing with the example from FIG. 3, the power manager 204 may determine that since the frame buffer 306 was not modified that the power to an encoder hardware block engine 210 should be adjusted, since the encoder hardware block engine 210 may not need to encode the frame buffer 306. The method 400 may continue with adjust the power to the hardware block engine 408. For example, continuing with the example of FIG. 3, the power manager 204 may adjust the power to a hardware block engine 210 by using a power control 212 which may be a clock speed of the hardware block engine 210. Continuing with the example, the power manager 204 may reduce the clock speed to the hardware block engine 408 for encoding. The power manager 204 may reduce the clock speed for a period of time based on the refresh rate of the wireless display 330. The method 400 may then stop 410. Alternatively, if at 406 it was determined that the hardware block engine should not be adjusted then the method 400 may continue to stop 410.

Some disclosed embodiments have the advantage that by identifying specific external event, the amount of time that the power to a hardware block engine 210 may be adjusted may be based on the specific external event so that more power may be saved when a specific external event is not identified.

Some disclosed embodiments have the advantage that since the power is being controlled to the hardware block engines 210 based on external events to the hardware block engines 210 that the power to the hardware block engines 210 may be reduced more than methods that rely on monitoring the activity of the hardware block engines 210.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). The computer-readable storage may be non-transitory.

What is claimed is:

1. A method of event based dynamic power management, the method comprising:
    receiving, at a processor having a plurality of hardware block engines each configured to perform a function, an indication of an occurrence of an event external to the plurality of hardware block engines;
    in response to receiving the indication of the occurrence of the event external to the plurality of hardware block engines,
    determining whether or not the occurrence of the event indicates adjusting an amount of power used by one of the plurality of hardware block engines; and
    adjusting the amount of power used by the one hardware block engine without monitoring an activity of the one hardware block engine while an amount of power used by one or more other hardware block engines of the plurality of hardware block engines is maintained when it is determined that the received event indicates adjusting the amount of power used by the one hardware block engine.

2. The method of claim 1, wherein the event is at least one of: an indication that a frame buffer for a wireless display has not changed, or an indication that the frame buffer for the wireless display has changed.

3. The method of claim 1, further comprising:
    receiving an indication of an occurrence of a second event, wherein the occurrence of the second event is external to the one hardware block engine,
    determining whether or not the occurrence of the event and the occurrence of the second event indicates adjusting the amount of power used by the one hardware block engine based on the first event and the second event, and
    if it is determined that the received event indicates adjusting the amount of power used by the one hardware block engine, adjusting the amount of power used by the one hardware block engine based on the event and the second event.

4. The method of claim 1, wherein adjusting further comprises:
    adjusting the amount of power to the one hardware block engine for an amount of time based on the received event.

5. The method of claim 4, wherein adjusting further comprises:
    adjusting the amount of power to the one hardware block engine for an amount of time based on the received event and an internal state of the one hardware block engine.

6. The method of claim 1, wherein the one hardware block engine receives the event.

7. The method of claim 1, wherein a power management module receives the event.

8. The method of claim 1, wherein adjusting the power to the one hardware block engine comprises at least one of reducing a number of clock cycles, or increasing the number of clock cycles, wherein the number of clock cycles is a number of clock cycles used to drive the one hardware block engine.

9. The method of claim 1, wherein the event is not based on monitoring the activity of the one hardware block engine.

10. The method of claim 1, wherein the one hardware block engine is at least one of an encoding hardware block engine used to encode a frame buffer of a wireless display, and a video accelerator.

11. A device for dynamic power management, the device comprising:
    a plurality of hardware block engines each configured to perform a function and a service for the operation of a component;
    an external event detector configured to detect an occurrence of an event external to the plurality of hardware block engines and related to the component; and
    a power manager configured to:
        receive an indication of the occurrence of the event and determine whether or not the occurrence of the event indicates adjusting an amount of power used by one hardware block engine of the plurality of hardware block engines; and
        when the received event indicates adjusting the amount of power used by the one hardware block engine, adjusting the amount of power to the one hardware block engine without monitoring an activity of the one hardware block engine while an amount of power used by one or more other hardware block engines of the plurality of hardware block engines is maintained.

12. The device of claim 11, wherein the event is at least one of: an indication that a frame buffer for a wireless display has not changed, or an indication that the frame buffer for the wireless display has changed.

13. The device of claim 11, further comprising:
    a second external event detector configured to detect an occurrence of a second event related to a second component and configured to send an indication of the occurrence of the second event to the power manger; and
    wherein the power manger is further configured to receive the indication of the occurrence of second event external to the one hardware block engine, and wherein the one power manger is further configured to adjust the amount of power used by the one hardware block engine by determining whether or not the occurrence of the event and the occurrence of the second event indicates adjusting the amount of power used by the one hardware block engine based on the first event and the second event, and if it is determined that the amount of power should be adjusted, adjusting the amount of power to the one hardware block engine based on the first event and the second event.

14. The device of claim 11, wherein the one hardware block engine further comprises an internal state; and wherein the power manager is further configured to adjust the amount of power to the one hardware block engine for an amount of time based on the received event and an internal state of the one hardware block engine.

15. The device of claim 11, wherein adjusting the power to the one hardware block engine comprises at least one of reducing a number of clock cycles, or increasing the number of clock cycles, wherein the number of clock cycles is a number of clock cycles used to drive the one hardware block engine.

16. The device of claim 11, wherein the one hardware block engine is at least one of an encoding hardware block engine used to encode a frame buffer for sending to a wireless display, and a video accelerator.

17. The device of claim 11, further comprising a plurality of power managers, wherein each of the plurality of hardware block engines comprises a corresponding power manager of the plurality of power managers.

18. The device of claim 11, further comprising;
a processor including the plurality of hardware block engines; and
a plurality of power managers separate from the plurality of hardware block engines.

\* \* \* \* \*